No. 717,361. Patented Dec. 30, 1902.
A. F. DIETZ.
STEP FOR VEHICLES.
(Application filed Oct. 25, 1902.)
(No Model.)
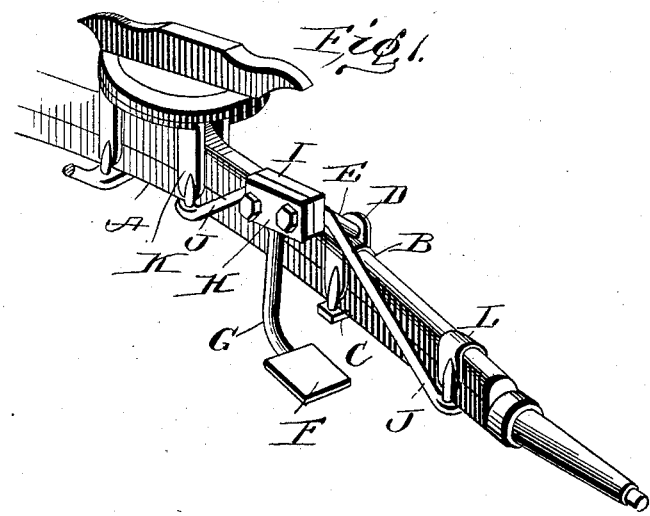
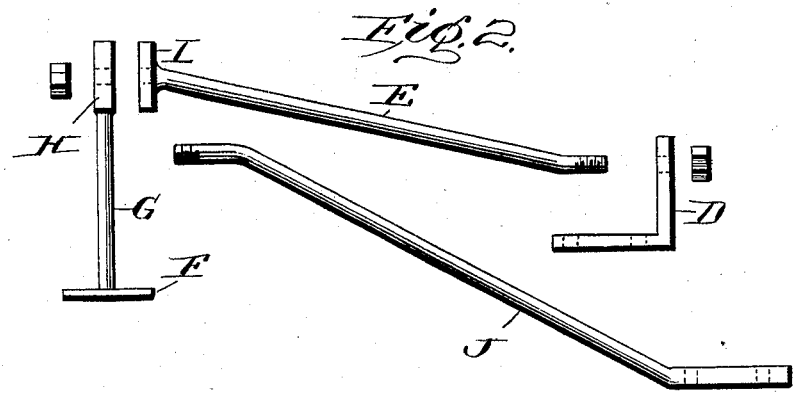
Witnesses
J. M. Fowler Jr.
H. H. Bates
Inventor
Alanson F. Dietz
By Grant Burroughs
Attorney
THE NORRIS PETERS CO., PHOTO-LITHO., WASHINGTON, D. C.

UNITED STATES PATENT OFFICE.

ALANSON F. DIETZ, OF ALTAMONT, NEW YORK.

STEP FOR VEHICLES.

SPECIFICATION forming part of Letters Patent No. 717,361, dated December 30, 1902.

Application filed October 25, 1902. Serial No. 128,743. (No model.)

*To all whom it may concern:*

Be it known that I, ALANSON F. DIETZ, a citizen of the United States, and a resident of Altamont, in the county of Albany and State of New York, have invented certain new and useful Improvements in Steps for Vehicles, of which the following is a full, clear, and exact description, such as will enable those skilled in the art to which it appertains to make and use the same, reference being had to the accompanying drawings, forming a part of this specification.

This invention relates to improvements in steps for vehicles, and more particularly in steps for vehicles of that class which are used by venders in selling and disposing of their goods. In such vehicles there is much getting in and out on the part of the vender, and where the steps are mounted on the thills, as they usually are, the uneven strain thrown on the thills by the weight of the vender in getting in and out of his vehicle on one side or the other causes the harness to chafe the horse. In the present invention it is proposed to avoid this objectionable feature by mounting the steps on the front axle of the vehicle instead of on the thills.

The invention in carrying out this purpose consists in the novel construction, combination, and arrangement of parts, such as will be hereinafter fully described, pointed out in the appended claims, and illustrated in the accompanying drawings.

In the drawings, in which similar reference characters designate corresponding parts, Figure 1 is a perspective view of a step embodying the invention, and Fig. 2 shows the several parts detached from the axle and from each other.

The axle A, to which the step is attached, is of the construction ordinarily found in the front axles of venders' vehicles. Secured to the axle by the clip B is the angle-iron comprising the horizontal member C and the vertical member D. The horizontal member of the angle-iron is placed against the under side of the axle and has passing through it the members of the clip B, on the ends of which are turned nuts for securing the angle-iron and clip in place. The vertical member D of the angle-iron projects upwardly and rests against the back of the axle. Its upper end projects above the axle and has secured in the same the inner end of the main support E. The latter rests on the top of the axle, which forms a fulcrum for the same. By means of this attachment the main support is firmly held in place against downward pressure on its outer end.

The foot plate or rest F is secured to the lower end of the shank G, and the upper end of the latter is integral with the plate H. On the outer end of the main support E is the plate I, to which the plate H is secured, the two plates being of substantially the same configuration.

Auxiliary braces J are provided to prevent a lateral displacement of the step. The inner end of one of the braces is secured to the under side of the axle A by the clip K on one side of the attachment of the main support to the axle, and the inner end of the other brace is secured to the under side of the axle by the clip L on the other side of the attachment of the main support. The clip K may also serve to secure part of the fifth-wheel mechanism to the axle. The outer ends of the auxiliary braces pass through the plates H and I and secure the two together, nuts being turned onto the projecting ends of the braces for the purpose.

It is to be observed that the inner ends of the auxiliary braces are considerably separated, and consequently offer considerable resistance to any tendency that the step may have to move laterally, and also that while the main support leads from the top of the axle the auxiliary braces lead from its bottom, which permits the braces to aid in sustaining any downward pressure on the step. In this way a step is produced that is efficient in its purpose, of simple construction, and one which can be applied to the vehicle in ordinary use without changing the construction of its axle in any way.

Having thus described my invention, what I claim, and desire to secure by Letters Patent, is—

1. In a vehicle-step, an axle, an angle-iron with one of its members placed against the under side of said axle and its other member resting against the back of the axle, a clip securing said angle-iron to said axle, a main support having its inner end secured to the upper end of the member of the angle-iron resting against the back of the axle and fulcrumed on said axle, a step attached to the outer end of said support, and auxiliary braces leading from the outer end of said main support and secured to said axle.

2. In a vehicle-step, an axle, an angle-iron with one of its members placed against the under side of said axle and its other member resting against the back of the axle, a clip securing said angle-iron to said axle, a main support having its inner end secured to the upper end of the member of the angle-iron resting against the back of the axle and fulcrumed on said axle, a plate secured to the outer end of said main support, a foot-plate having a shank provided with a plate on its upper end, and auxiliary braces secured at their inner ends to said axle and passing through said plates at their outer ends to hold said plates together.

In testimony whereof I hereunto affix my signature in the presence of two witnesses.

ALANSON F. DIETZ.

Witnesses:
HIRAM GRIGGS,
FRANK BENN.